UNITED STATES PATENT OFFICE.

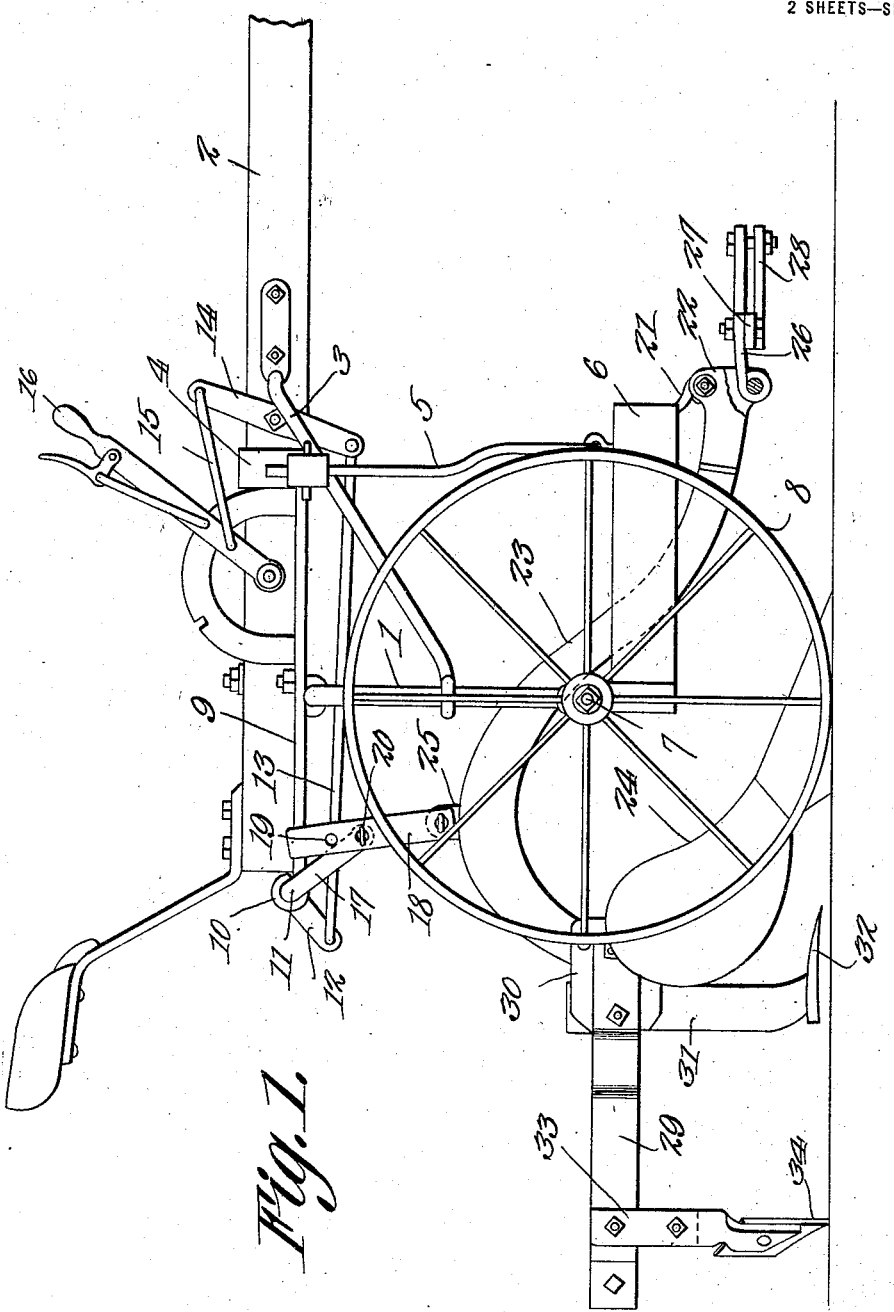

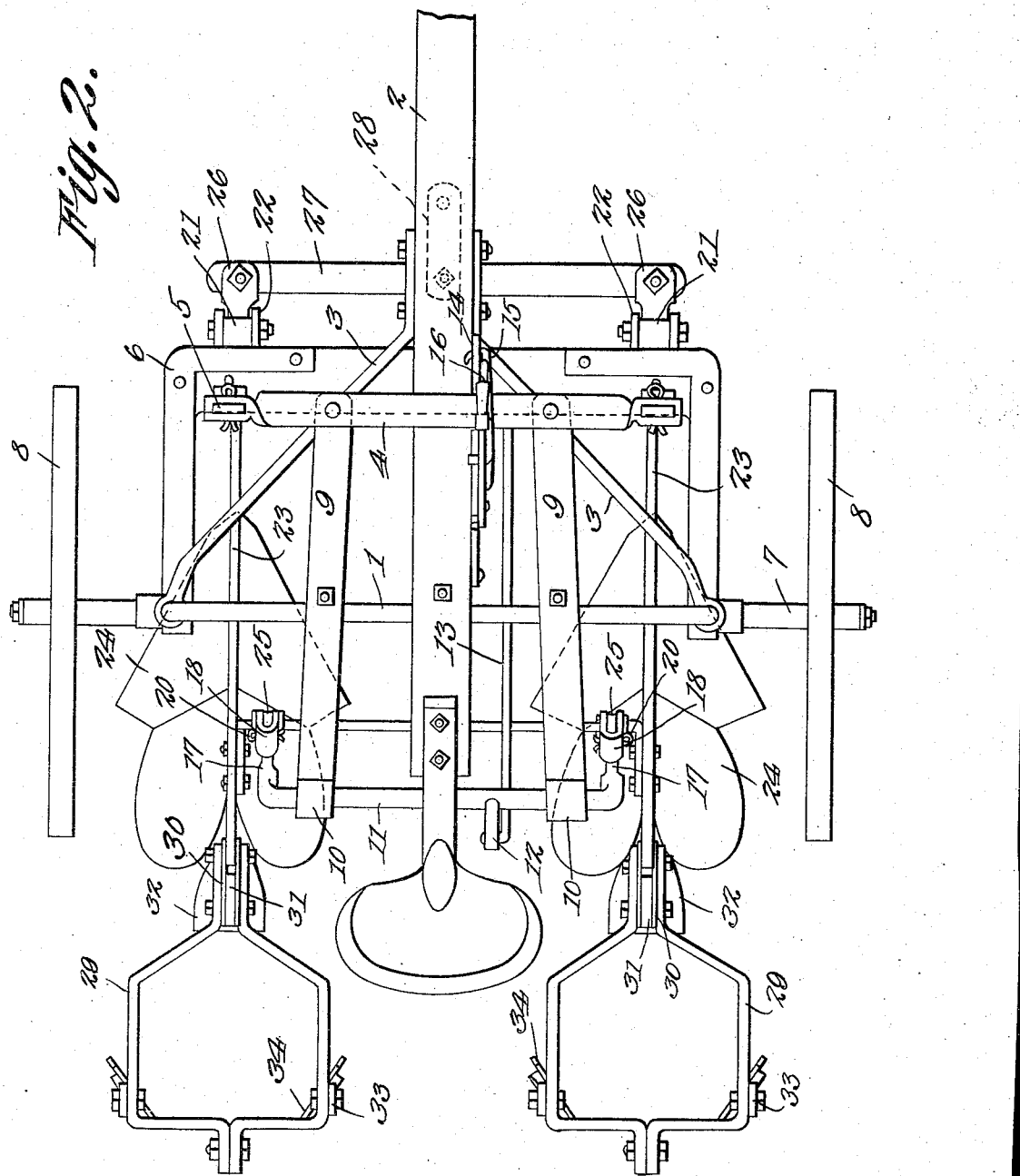

WESTON J. WALTER AND HARRY C. WALTER, OF BLACKWELL, OKLAHOMA.

LISTER-PLOW.

1,183,783.  Specification of Letters Patent.  Patented May 16, 1916.

Application filed June 1, 1914. Serial No. 842,271.

*To all whom it may concern:*

Be it known that we, WESTON J. WALTER and HARRY C. WALTER, citizens of the United States, residing at Blackwell, in the county of Kay, State of Oklahoma, have invented a new and useful Lister-Plow, of which the following is a specification.

This invention relates to double row listing plows, its object being to provide a light, durable and efficient plow of this character especially designed for preparing ground for the planting of wheat, corn, etc. Heretofore in preparing ground for wheat, and the like, it has been necessary first to plow the ground in close parallel ridges and subsequently to level off the ground by forcing some of the loosened soil back into the furrows.

One of the objects of the present invention is to provide an attachment for a plow whereby immediately after the ridges have been formed, portions of the loosened and lifted soil will be directed back into the furrow so that the ground will thus be left in condition for planting.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the double row listing plow constituting the present invention. Fig. 2 is a plan view thereof.

Referring to the figures by characters of reference 1 is an arched axle on which is secured a draft beam 2, said axle being fixed relative to the beam by means of braces 3. A cross beam 4 is secured to the beam 2 in front of the arched axle 1 and hangers 5 are suspended from the end portions of the beam 4, said hangers being adjustable vertically in any suitable manner. A U-shaped frame 6 is pivotally mounted at its ends upon the spindle 7 of the arched axle, this frame being extended forwardly and connected, at its front end, to the hangers 5 which thus coöperate with the spindle to hold the frame in a predetermined relation to the beam 2. The supporting wheels 8 engaging the spindle 7 are located outside of the frame 6.

Side strips 9 are secured at their front ends to the beam 4 and at intermediate points upon the arched axle 1, these side strips being preferably parallel with the beam 2 and being provided, at their rear ends, with bearings 10 in which is journaled a transverse shaft 11. An arm 12 extends radially from the shaft and is connected by a rod 13 to the lower end of a lever 14 fulcrumed upon one side of the beam 2, the upper end of the lever being connected by a link 15 to a hand lever 16. This hand lever is fulcrumed on the beam 2 and has any suitable means for holding it in any position to which it may be adjusted.

The shaft 11, is provided at its ends with parallel arms 17 each of which is straddled by a U-shaped link 18. Each link has a series of apertures 19 and a pivot pin 20 is insertible into certain of the apertures and into the engaged arm 17 for the purpose of connecting the link to the arm. By providing a series of apertures in each link, said link can be adjusted longitudinally relative to the arm 17.

Depending from the front portion of the frame 6 are brackets 21, each bracket being pivotally engaged by the upper end portion of a head 22 formed at the front end of a plow beam 23. As shown in the drawings, each plow beam is preferably curved upwardly and rearwardly to a point above the plow 24 and is then curved downwardly and forwardly to constitute a standard to which the plow 24 is attached. Extending from the uppermost portion of the beam 23 is an ear 25 to which one of the hangers 18 is pivotally connected. The plow 24 is of that type known as a middle buster.

Tongues 26 are pivotally connected to the lower portions of the heads 22 and the front ends of these tongues are secured to a cross bar 27 having a suitable coupling 28 extending forwardly from its center to which a whiffletree may be attached. Thus it will be seen that the draft will be exerted through the bar 27 and tongues 26 to the lower portions of the heads 22 with the result that the plows will not only be drawn forward but will be pressed downwardly into the soil until limited by the adjustable connections between the beams 23 and the shaft 11. When the plows are drawn forward they will produce ridges and furrows close together and, when it is desired to prepare the ground thus plowed for the planting of wheat, an attachment is applied to each of the beams 23 so that portions of the loosened soil will be thrown back into the furrows. This attachment includes oppositely disposed angular frame members 29 connected at their rear ends in any suitable manner while their front ends straddle a bracket 30 secured to the rear or standard portions of the beams 23. This bracket 30 has a standard 31 secured to it and provided with a shoe 32 following directly after the plow 24. The front ends of the frame members 29 are secured upon the sides of the bracket 30, these frame members extending laterally beyond the sides of the furrow produced by the plow in front thereof. A standard 33 is secured to the outer side portion of each frame member 29 and fastened to the lower end of each of these standards 33 is a shovel 34. Thus it will be seen that when the plow is drawn forward the soil thrown laterally by the middle busters will be partially collected by the shovels 34 and moved back into the furrows, this resulting in the proper preparation of the ground for the planting of seed such as wheat. Obviously by manipulating lever 16, the beams 23 can be swung upwardly and downwardly, thus to regulate the depth of the furrows produced by the plows 24. By removing the attachments made up of the frame members 29, the structure can be used solely for plowing.

What is claimed is:—

The combination with a wheel supported draft beam and a structure therebelow and movable therewith, of a plow beam pivotally connected to and trailing from said structure, opposed frame members fixedly secured to and extending rearwardly from the beam close to the upper end of the plow, said frame members having intermediate laterally extending portions integral therewith, soil engaging devices adjustably connected to the frame members, and means connected to the draft beam for raising the plow beam and the frame members attached thereto, and a draft device connected to the front end of the plow beam and below the connection between said beam and the suspended structure.

In testimony that we claim the foregoing as our own, we have hereto affixed our signatures in the presence of two witnesses.

WESTON J. WALTER.
HARRY C. WALTER.

Witnesses:
E. SEATON,
E. E. WHEELER.